May 2, 1961  R. A. BALLEY  2,982,418
FILTERS FOR LIQUIDS
Filed May 20, 1958

INVENTOR
RONALD ALBERT BALLEY

BY:
Paul M. Craig, Jr.
ATTORNEY

United States Patent Office 2,982,418
Patented May 2, 1961

2,982,418
FILTERS FOR LIQUIDS
Ronald Albert Balley, Bletchley, England, assignor to WIPAC Filtration Limited, Bletchley, England
Filed May 20, 1958, Ser. No. 736,564
1 Claim. (Cl. 210—448)

The present invention relates to filters for liquids and is concerned particularly, but not exclusively, with fuel filters for internal combustion engines.

It is an object of this invention to provide a cheap, light-weight replaceable fuel filter unit which can be quickly and easily connected in, or substituted for, the fuel pipe of an internal combustion engine and which, in use, acts as a shock-absorber to relieve stresses in the fuel pipe in which it is connected or to accommodate relative movements which would otherwise produce such stresses in the fuel pipe replaced by it.

With this object in view, the improved filter according to this invention comprises a length of flexible tubing and a filter element in the form of a thimble of porous material located in the bore of said tubing, so that liquid flowing from one end of said length of tubing to the other must pass through said filter element.

The length of flexible tubing may be a relatively short length, the ends of which can be engaged over metal or like pipe ends between which the filter is adapted to be connected. Alternatively the length of flexible tubing, when designed to replace a fuel pipe or the like may have its ends engageable over unions connected or adapted to be connected to components such as for example a carburetter and a fuel tank.

The end parts of the flexible tube are advantageously reinforced externally by resilient metal clips.

The tube is advantageously made of a transparent material, so that it is possible to see at a glance whether liquid is passing through it and whether or not the filter element requires cleaning.

The filter element may be made of a porous ceramic material or of porous sintered bronze.

Figure 1:
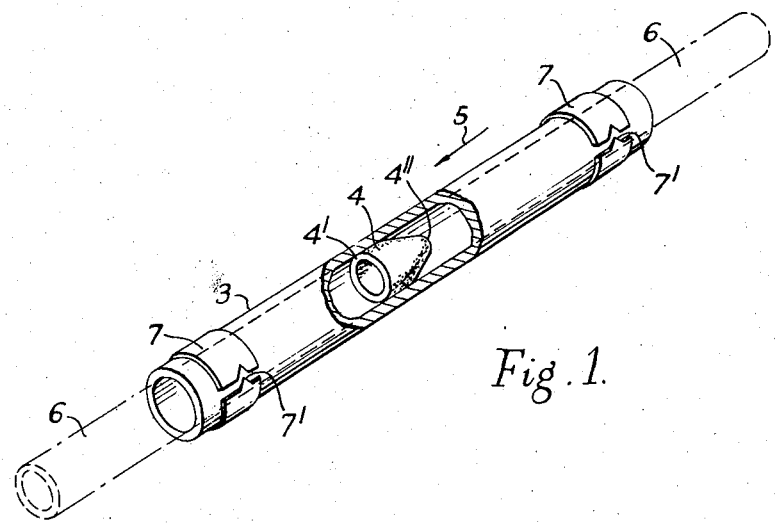
Figure 2:
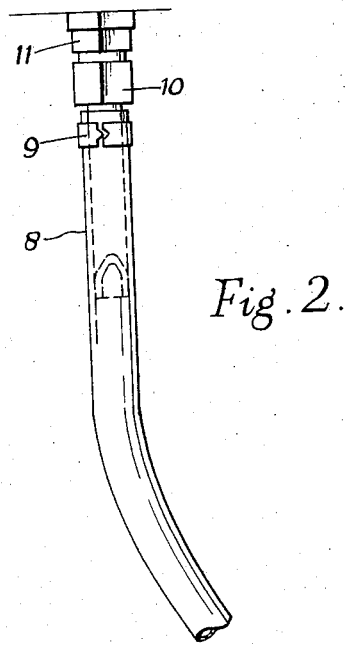

The invention will now be described by way of example with reference to the accompanying drawings, in which:

Fig. 1 is a perspective view of a fuel filter connected in a fuel line, the filter being partly broken away to show a filter element therein, and Fig. 2 is an elevation showing a combined filter and petrol pipe connected to the outlet connection of a petrol tank.

Referring to Fig. 1, a fuel filter consists of a flexible tube 3 of transparent synthetic plastic material within which is arranged, in a position approximately midway between its ends, a filter element in the form of a thimble 4 of porous ceramic material. The thimble 4 is a sufficiently tight interference fit in the bore of the tube 3 to ensure that it will not become displaced along the tube by petrol to be filtered flowing through the tube 3 in the direction of arrow 5.

The tube 3 in this embodiment is 3" long and has a bore of such diameter as to be an interference fit over the fuel pipe end parts 6, which in the embodiment described have an outside diameter of ¼".

The thimble 4, which has a wall thickness of between 1/16" and 1/8", has its concave side facing in the direction of the arrow 5, i.e. away from the end of the tube 3 through which the unfiltered petrol is adapted to be admitted. For a short distance from its rim end 4', the thimble is parallel-sided, i.e., comprising a cylindrical portion, while its other end, merging with this portion, is tapered inward to a rounded point 4". The cylindrical portion comprises a substantial portion, approaching one half, of the length of the thimble and the relative diameters of this portion and of the inner wall of the tube are such as to cause a rigid frictional engagement between the outer surface of this portion and the inner surface of the tube constituting the interference fit before referred to. The foregoing described structure constitutes the sole means for securing the thimble in the tube against longitudinal displacement caused by the flow of petrol through the tube.

The end parts of the tube 3 are reinforced externally by spring clips 7 in the form of bands which are split parallel to their central axes so that they can expand and contract resiliently. One end of each clip 7 adjacent the split therein is formed with a tooth 7' which is pressed into the material of the tube and serves to prevent displacement of the clip.

To fit this filter in an existing petrol pipe, the latter is cut at a position remote from its ends and the cut ends are suitably separated, after which the reinforced ends of the flexible tube 3 are slipped over the cut end parts 6 of the fuel pipe.

The thimble constituting the filter element may be made in various shapes other than that described above and illustrated in Fig. 1. For example, it may have a dome-shaped part adjoining the parallel-sided part, or it may have a small diameter closed-ended extension connected to the parallel-sided part by an inwardly tapered intermediate part.

The tube need not necessarily be transparent and a suitable non-transparent material is that which is known under the registered trademark Neoprene.

Fig. 2 illustrates an alternative embodiment of the invention in which the tube 8 of the filter, instead of being a short tube 3 as shown in Fig. 1 with its ends fitted over fuel pipe end parts 6, is made of sufficient length to enable it to replace the petrol pipe altogether. In this case, the inlet end of the tube 8 is reinforced by a clip 9 similar to the clips 7 in Fig. 1 and is engaged tightly over a tubular projection on a union 10 which is screwed to a connection 11 at the bottom of a petrol tank. The other end (not shown) of the tube 8 is similarly reinforced and fitted on a union which is screwed to a connection on a carburetter.

I claim:

A petrol filter comprising a length of tubing of a flexible and resiliently deformable transparent synthetic plastic material and having inlet and outlet ends, a hollow thimble disposed in said length of tubing intermediate said ends, said thimble being composed of porous sintered bronze and having a closed end comprising a rounded end portion extended toward said inlet end, said thimble further comprising an open end, a cylindrical portion terminating at said open end, a tapered portion terminating at said rounded end portion and merging with said cylindrical portion, the outer surface of said cylindrical portion engaging the inner wall of said tubing and having a surface extent comprising a substantial portion of the length of said thimble, sole means securing said thimble in said tubing against longitudinal displacement therein caused by the flow of said petrol through said tube, said means comprising the said outer surface and the relative diameters of said cylindrical portion and of said inner surface of said tubing, said outer surface and said inner surface being in rigid frictional engagement, said surface extent and said relative diameters being such as to cause an interference fit between said cylindrical portion and the said inner wall of said tubing, and flexible metallic reinforcing means surrounding portions of said length of tubing at said inlet and outlet ends, comprising radially expandable clip rings.

References Cited in the file of this patent

UNITED STATES PATENTS

| | | |
|---|---|---|
| 1,832,776 | Hudson | Nov. 17, 1931 |
| 2,160,571 | Bates | May 30, 1939 |
| 2,604,958 | Leufvenius | July 29, 1952 |
| 2,665,960 | Causley | Jan. 12, 1954 |
| 2,702,036 | Bent | Feb. 15, 1955 |
| 2,839,195 | Reimers et al. | June 17, 1958 |